United States Patent [19]

Cunningham

[11] Patent Number: 4,731,010
[45] Date of Patent: Mar. 15, 1988

[54] EXTRUSION DIE FOR FORMING THIN-WALLED HONEYCOMB STRUCTURES

[75] Inventor: George M. Cunningham, Horseheads, N.Y.

[73] Assignee: Corning Glass Works, Corning, N.Y.

[21] Appl. No.: 52,875

[22] Filed: May 22, 1987

[51] Int. Cl.⁴ ............................................. B29B 47/12
[52] U.S. Cl. ................. 425/461; 264/177.11; 264/177.12; 425/464
[58] Field of Search ................... 228/174; 264/177.11, 264/177.12, 209.1, DIG. 70; 425/192, 197, 461, 462, 463, 464, 466, 467, DIG. 217

[56]  References Cited

U.S. PATENT DOCUMENTS 4,118,456 10/1978 Blanding et al. ............... 264/177.12
4,321,025 3/1982 Cunningham ...................... 425/466
4,373,895 2/1983 Yamamoto et al. ................ 425/461
4,465,454 8/1984 Duerr et al. ......................... 425/461

Primary Examiner—Jay H. Woo
Assistant Examiner—C. Scott Bushey
Attorney, Agent, or Firm—Thomas J. Greer, Jr.

[57]  ABSTRACT

An extrusion die for extruding a honeycombshaped structure having rectangular channels. The die is formed of a hard, rigid material, preferably metal, and includes a body plate and an abutting face plate. The outlet face of the body plate is brazed to the inlet face of the face plate. The body plate has a plurality of slightly staggered primary feed holes, the outlet ends of each communicating with an associated feed reservoir, the latter each defined by a recess or depression in the inlet surface of the face plate. Each feed reservoir communicates with the inlet ends of three associated secondary feed holes. The outlet surface of the face plate integrally carries a plurality of intersecting slot segments defining rectangular pins. The outlet end of each secondary feed hole communicates with and feeds an associated intersection of groove segments. The arrangement is such that the number of slot intersections is greater than the number of secondary feed holes, with two diagonally opposite corners of any pin communicating with a secondary feed hole. The combination of rectangular pins (discharge slots) and staggering of the main feed holes maximizes the die interface brazing area to thereby realize honeycomb cell densities of 900–1400 cells per square inch.

11 Claims, 7 Drawing Figures

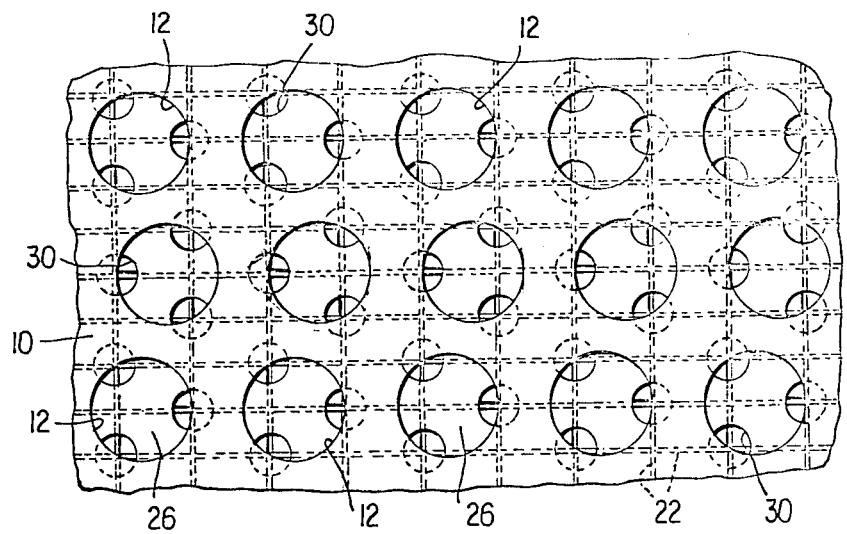
FIG. 4
FIG. 5
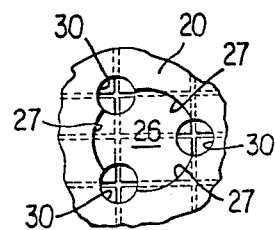
FIG. 6
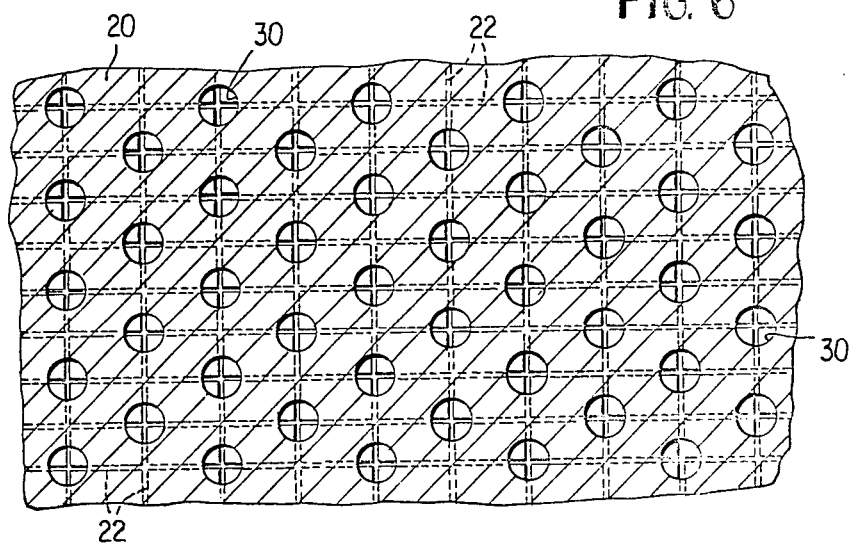
FIG. 7
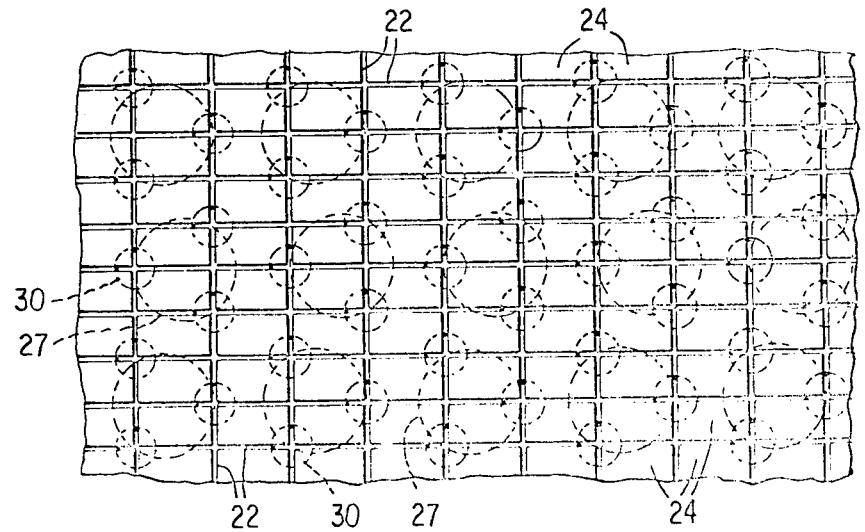

EXTRUSION DIE FOR FORMING THIN-WALLED HONEYCOMB STRUCTURES

BACKGROUND OF THE INVENTION

This invention relates to an extrusion die for forming thin-walled honeycomb structures from extrudable materials such as glass, glass-ceramics, ceramics, plastics, metals, cermets and other materials, especially those in particulate form, which are capable of being extruded through relatively small holes or channels whose length is several times their diameter or transverse dimension and which, after extrusion, will substantially immediately become rigid enough to retain the extruded shape, i.e., a honeycomb configuration.

Thin-walled honeycomb structures display utility in a variety of technologies. For example, thin-walled honeycomb structures fashioned from ceramic materials exhibit utility as catalytic converters in the exhaust system of internal combustion engines. They also exhibit utility as radiators, catalyst carriers, filters, and heat exchangers.

The prior art is aware of a number of extrusion die constructions for forming thin-walled honeycomb structures, such as shown in U.S. Pat. Nos. 3,790,654 issued to Bagley, 3,824,196 issued to Benbow and 4,354,820 issued to Yamamoto.

Additionally, U.S. Pat. No. 4,465,454 issued to Duerr et al discloses a die for extruding thin-walled honeycomb structures, wherein the slots on the outer outlet face of the face plate are arranged so as to produce longitudinal channels which are square in transverse cross-section. Further, the inlet surface of the face plate is provided with a plurality of feed reservoirs which are aligned with the feed holes in the body plate. The feed reservoirs each communicate with a plurality of secondary (face plate) feed holes, the latter each discharging to a respective (face plate) discharge slot segment.

SUMMARY OF THE INVENTION

The present invention relates to a two-piece extrusion die defined by a body plate and a face plate. The construction of this invention permits the production of relatively high cell density honeycombs having acceptable mechanical strength with continuous interior cell walls.

The longitudinal passages of the honeycomb extrusion made by the die of this invention are rectangular in transverse cross section, preferably with the ratio of long to short rectangular side being greater than about 2:1.

Cell densities in the honeycomb extrudate of between 900 and 1400 cells per square inch are realized by a novel arrangement of primary feed holes in the face plate. Such high cell densities are, in general, not possible with honeycomb extrudates having channels of square transverse outline. Alternate feed holes in the vertically extending rows of the body plate are laterally staggered, as are the reservoir holes in the inlet face of the face plate. This displacement or staggering permits a greater (land) surface area between the lower surface of the body plate and the upper surface of the face plate.

A major factor limiting high cell densities of honeycomb extrudates is the requirement that the opposed faces of the body and face plates be brazed together. Clearly, the greater the land area, the greater the brazing area available (land area being the total area minus the area of the feed and reservoir holes). The high pressure required to force the material through the die tends to separate the two die pieces and hence it is essential that the interface land area available for brazing, to maintain the die halves pieces be as great as possible. On the other hand, a large land area diminishes the feed and reservoir area needed to achieve high cell densities. Further, the greater the number of feed and reservoir holes, the weaker the body and face plates become.

By the combination of rectangular discharge slots in the face plate and staggered feed/reservoir holes, an optimum die configuration for high cell densities (900–1400 cells per square inch) is realized, for die materials of construction presently available. The usual secondary feed holes associated with the reservoirs are arranged to feed into diagonally opposite corners of the face plate discharge slot rectangles.

In the present invention, the outlet surface of the face plate is a rectangular matrix defined by intersecting slots or grooves (the latter already known in this art) with the inlet surface of the face plate having a pattern of feed reservoirs defined by spaced surface recesses. The intersecting slots are defined by a first set of parallel slots which orthogonally intersect a second set of parallel slots with the land or non-grooved area defining rectangular points. The reservoirs each serve as a pooling area to feed a corresponding group of secondary or smaller feed holes which then feed, in turn, the discharge grooves or slots from which the material is finally extruded. In the preferred embodiment of the invention to be described, each feed reservoir has a corresponding group of three secondary feed holes.

The body plate, which initially receives the material to be extruded, contains feed holes, termed primary feed holes. These holes feed material to be extruded into the feed reservoirs. The body plate has an inlet face or portion and an outlet face, the terms "inlet" and "outlet" referring to the direction of the passage of the material to be extruded through the die.

According to the construction of the extrusion die of this invention, one primary feed hole supplies extrudable material to one feed reservoir, each primary feed hole being aligned with a respective, corresponding feed reservoir, with each feed reservoir, in turn, feeding three secondary feed holes. Each secondary feed hole then feeds a respective intersection of the discharge slots in the outlet face of the face plate. The primary feed holes, as well as their corresponding feed reservoirs, are rowwise staggered to produce an alternating pattern.

This alternating pattern and the feed reservoir relationship to the secondary feed holes are both important in the operation of the extrusion die. The alternating pattern of the feed reservoirs yields a die which produces a rectangular substrate product, i.e., the channels of the honeycomb are rectangular in transverse cross-section. This alternating pattern provides an extrusion die which requires fewer primary feed holes in the body plate than prior constructions. This, in turn, permits a reduction in batch material flow impedance.

BRIEF DESCRIPTION OF THE DRAWINGS

FIG. 4 is a view taken along line 4—4 of FIG. 3.

FIG. 5 is a view taken along section 5—5 of FIG. 3.
FIG. 6 is a view taken along section 6—6 of FIG. 3.
FIG. 7 is a view taken along line 7—7 of FIG. 3.

DETAILED DESCRIPTION OF THE INVENTION

Figure 1:
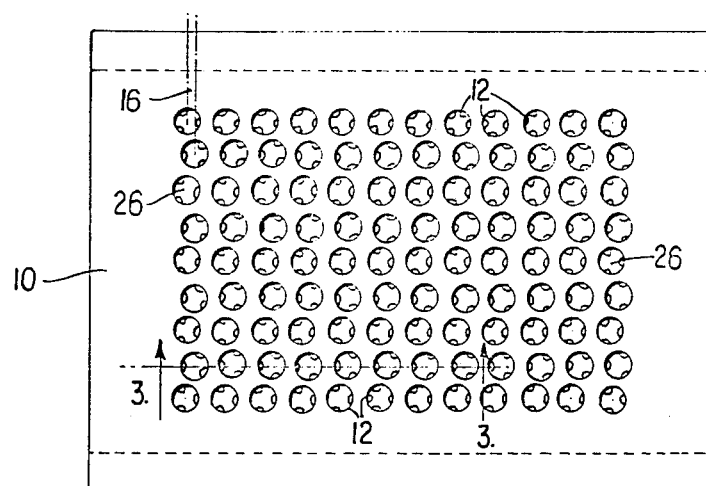
FIG. 1 is a plan view of the inlet face of a two piece extrusion die formed in accordance with this invention.

Referring now to the drawings, the numeral 10 denotes an upper or body plate fashioned from a hard material, such as metal or a hard plastic. The numeral 12 denotes any one of a plurality of primary feed holes extending completely through body plate 10. The numeral 16 denotes a lateral or horizontal offset between corresponding primary feed holes 12 of adjacent horizontal rows of primary feed holes 12. The feed holes 12 are thus rowwise staggered, i.e., each vertical column consists of horizontally staggered primary feed holes. In general, the vertical spacing between the several rows of holes 12 is uniform, as is the horizontal spacing between holes 12 of any row. The amount of the staggering or offset 16 is, in general, less than the diameter of holes 12 and is less than their radius as illustrated.

The numeral 20 denotes a face plate, fashioned usually from the same material as body plate 10. Plates 10 and 20 are held in abutting, surface to surface contact by brazing (in the case of metal) or by epoxying (in the case of plastic as a material of construction), with primary feed holes 12 aligned with certain feed reservoirs, soon to be described. The outlet face of plate 20 is provided with a plurality of orthogonally intersecting, straight slots or grooves 22, to thereby define groove segments, each of which has generally parallel walls. The slots or grooves 22 run generally horizontally and vertically in the views of FIGS. 2 and 4-7. These intersecting slots define rectangular lands or pins 24, with each pin bordered and defined by slots segments.

Figure 3:
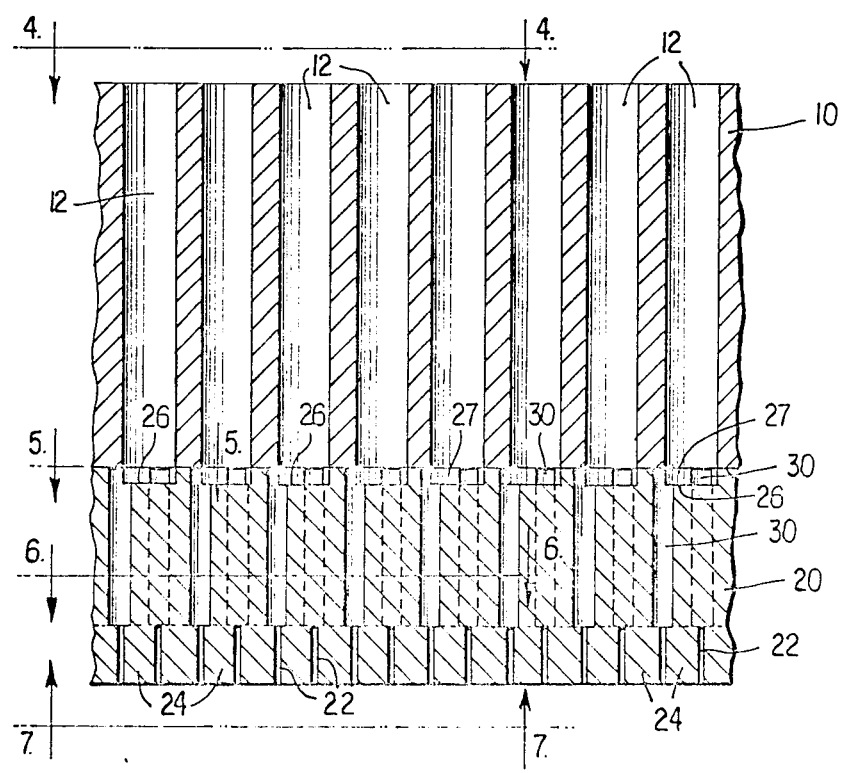
FIG. 3 is a view taken along section 3—3 of FIG. 1.

Referring now particularly to FIG. 3, it is seen that the outlet surface of body plate 10 is in facing, abutting relationship with the inlet surface of face plate 20. Face plate 20 is provided with a plurality of feed recesses 26 in its inlet surface, with each feed recess having a periphery intersected by three associated secondary feed holes 30. As seen by reference to FIG. 4, the periphery of each feed reservoir or recess 26 is coincident with the periphery of the outlet portion of a corresponding primary feed hole 12, the diameter of each feed reservoir 26 thus being the same as that of its corresponding primary feed hole 12. Further, as may be seen by reference to FIGS. 4 and 5, a portion of the inlet end of each of the three secondary feed holes 30 (corresponding to and associated with a given feed reservoir 26) extends laterally beyond the periphery of feed reservoir 26, while another portion thereof has been cut off by the feed reservoir, but would extend radially inwardly of the feed reservoir periphery.

Each feed reservoir is generally cylindrical, typically having a substantially flat bottom and curved, vertically extending sides 27, angularly spaced portions of the sides being intersected by the upper ends of secondary feed holes 30, as shown at FIG. 5. In the illustrated embodiment, the side walls of any reseroir 26 pass through the longitudinal axes of its associated secondary feed holes 30 to thereby form a cylindrical recess having three angularly spaced bulges on its side walls, these bulges extending radially outwardly.

As may be seen now by reference to FIG. 6, the outlet portion of each secondary feed hole 30 communicates with an intersection between four associated slot segments 22, the longitudinal axis of each secondary feed hole 30 being coincident with the point of intersection of these (radiating) associated slots segments 22. The extent or length of feed reservoirs 26 and of rectangular pins or lands 24 is shown in FIG. 3.

Again referring to FIGS. 3,5 and 6, it is seen that as the extrusion material passes through each primary feed hole 12, it enters a corresponding, associated single feed reservoir 26 on the inlet surface of face plate 20. From each feed reservoir, the material enters the inlet portion of each of three associated secondary feed holes 30. Each feed hole 30 feeds or supplies a corresponding, associated intersection of slots 22. While passing through the vertical thickness (see FIG. 3) of slots 22 from each groove intersection (see FIG. 5), the material will pass from a slot intersection both horizontally and downwardly, so that by the time the material exits from the outlet surface of face plate 20, around pins 24, continuous and interconnected walls will be extruded, thereby forming a honeycomb structure having rectangular holes or channels each of which has continuous walls.

From a consideration of FIGS. 4-7, it is seen that every second slot segment intersection, fed from an associated secondary feed holes 30, supplies material to four associated slot segments, each such segment defining one side wall of each of four adjacent pins 24. Two of the four diagonally opposite corners of any pin 24 are fed by an associated secondary feed hole. Every other slot intersection (in any row or column of slots 22) is fed by an associated secondary feed hole 30. Thus, the number of secondary feed holes 30 is less, by a factor of two, than the number of slot or groove segment intersections.

Figure 2:
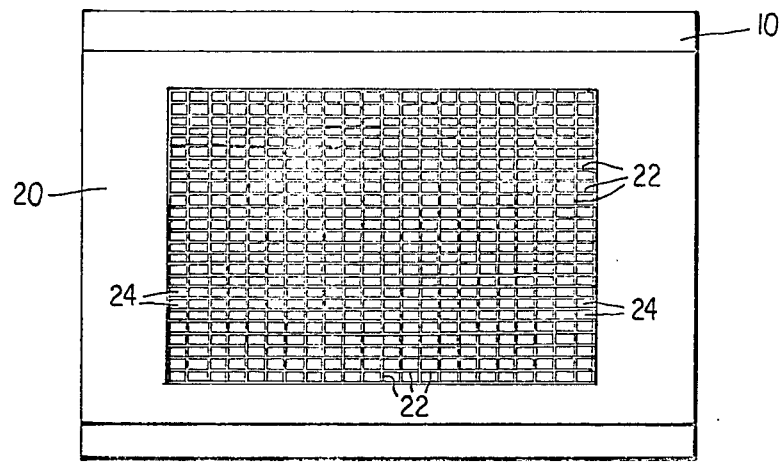
FIG. 2 is a plan view of the outlet face of the two piece extrusion die of this invention.

From a consideration of FIGS. 1, 2 and 4, it is seen that the amount of lateral offset or displacement 16 depends on the ratio of long to short sides of each rectangular pin 24 and upon the overlap between secondary feed holes 30 and their corresponding feed reservoirs 26.

Terms such as "vertical" and "horizontal" are employed as terms of orientation to facilitate description and are not intended as terms of limitation. Further, as often used in the extrusion die art, the term "inlet" refers to the material entrance portion of a die, while the term "outlet" refers to the material exit portion. Thus, the inlet portion of face plate 20 is seen at FIG. 5, while the outlet portion or surface of face plate 20 is seen at FIG. 7.

I claim:
1. An extrusion die for extruding and forming a thin-walled honeycomb structure, said die including a body plate and a face plate each having an inlet surface and an outlet surface, the outlet surface of said body plate being in facing, abutting contact with the inlet surface of said face plate, said body plate having a plurality of parallel, elongated, primary feed holes each having a longitudinal axis, said primary feed holes extending from the inlet to the outlet surface of said body plate, the inlet surface of said face plate having a plurality of recesses to thereby define a plurality of feed reservoirs, an outlet end of each of said primary feed holes communicating with a respective feed reservoir, said face plate also having a plurality of parallel, secondary feed holes, the outlet surface of said face plate having a plurality of intersecting slot segments defining a plurality of pins, each pin bordered and defined by a plurality of slot segments, an outlet end of each of said secondary feed holes communicating with an associated, respective, intersection of said slot segments, each feed reservoir communicating with inlet ends of an associated plurality of said secondary feed holes, said primary feed holes being arranged in horizontal rows and being substantially uniformly spaced from each other in any horizontal row, and wherein corresponding primary feed holes of adjacent horizontal rows are horizontally displaced from each other to thereby define columnwise staggered primary feed holes, whereby material to be extruded passes from an inlet to the outlet end of each primary feed hole, thence to a respective feed reservoir, thence to the inlet end of each of a plurality of associated secondary feed holes, thence to the outlet end of each said secondary feed hole, thence to an associated slot segment intersection, thence both horizontally and downwardly from each associated slot intersection, to thereby form a honeycomb extrudate having continuous and interconnected parallel channels therein.

2. The extrusion die of claim 1 wherein said inlet and outlet surfaces of said body plate and of said face plate are parallel.

3. The extrusion die of claim 1 wherein each feed reservoir communicates with the inlet ends of three of said secondary feed holes.

4. The extrusion die of claim 1 wherein one portion of each inlet end of said secondary feed holes lies radially outside of a periphery of its associated feed reservoir and another portion of the inlet ends of each of said secondary feed holes lies radially inside of the periphery of its corresponding feed reservoir.

5. The extrusion die of claim 4 wherein each feed reservoir communicates with the inlet ends of three said secondary feed holes.

6. The extrusion die of claim 1 wherein said secondary feed holes are less in number than said slot segment intersections.

7. The extrusion die of claim 1 wherein said pins are rectangular.

8. The extrusion die of claim 6 wherein said slot segments are defined by the intersection of first and second sets of mutually orthogonal slots, to thereby define rectangular pins each bordered by slot segment, and wherein two of four diagonally opposite edges of each said rectangular pins are substantially aligned with the outlet end of a respective secondary feed hole.

9. The extrusion die of claim 8 wherein the number of said secondary feed holes is less than the number of said slot segment intersections.

10. The extrusion die of claim 1 wherein said primary feed holes are each of uniform diameter and wherein an amount of said horizontal displacement is less than said uniform diameter of each of said primary feed holes.

11. The extrusion die of claim 7 wherein a ratio of transverse cross-sectional length to width of each of said rectangular pins is greater than about 2:1.

* * * * *

UNITED STATES PATENT AND TRADEMARK OFFICE
CERTIFICATE OF CORRECTION

PATENT NO.   :   4,731,010
DATED        :   March 15, 1988
INVENTOR(S)  :   George M. Cunningham It is certified that error appears in the above-identified patent and that said Letters Patent is hereby corrected as shown below:

Title page:

In the Abstract, line 2, change "honeycombshaped" to --honeycomb-shaped--.

Column 2, line 26, change "points" to --pins--.

Column 4, line 2, change "slots" to --slot--.

Column 6, line 14, change "by slot" to --by a slot--.

Column 6, line 16, change "pins" to --pin--.

Signed and Sealed this

Twenty-first Day of February, 1989

*Attest:*

DONALD J. QUIGG

*Attesting Officer*   *Commissioner of Patents and Trademarks*